US011699338B2

(12) United States Patent
Fellows

(10) Patent No.: US 11,699,338 B2
(45) Date of Patent: Jul. 11, 2023

(54) SAFETY WARNING SYSTEM

(71) Applicant: Hazardtech Pty Ltd, Maroochydore (AU)

(72) Inventor: David Fellows, Maroochydore (AU)

(73) Assignee: Hazardtech Pty Ltd, Maroochydore (AU)

( * ) Notice: Subject to any disclaimer, the term of this patent is extended or adjusted under 35 U.S.C. 154(b) by 0 days.

(21) Appl. No.: 17/541,804

(22) Filed: Dec. 3, 2021

(65) Prior Publication Data

US 2022/0092958 A1 Mar. 24, 2022

Related U.S. Application Data

(63) Continuation of application No. 17/049,418, filed as application No. PCT/AU2019/050373 on Apr. 26, 2019, now abandoned.

(30) Foreign Application Priority Data

Apr. 26, 2018 (AU) .................. 2018901383

(51) Int. Cl.
*G08B 21/02* (2006.01)
*G01C 21/34* (2006.01)
*G06F 1/16* (2006.01)
*H04W 4/021* (2018.01)

(52) U.S. Cl.
CPC ......... *G08B 21/02* (2013.01); *G01C 21/3461* (2013.01); *G06F 1/163* (2013.01); *H04W 4/021* (2013.01)

(58) Field of Classification Search
CPC ...................................................... G08B 21/02
See application file for complete search history.

(56) References Cited

U.S. PATENT DOCUMENTS

| 7,030,777 | B1* | 4/2006 | Nelson | ................. | G08G 1/0955 340/940 |
|---|---|---|---|---|---|
| 2010/0298683 | A1 | 11/2010 | Cabrera et al. | | |
| 2014/0081534 | A1 | 3/2014 | Maynard et al. | | |
| 2015/0138002 | A1 | 5/2015 | Beggs et al. | | |
| 2016/0280240 | A1* | 9/2016 | Carlson | .................. | G01S 19/17 |

OTHER PUBLICATIONS

European Search Report dated Dec. 23, 2021 in EP App. No. 19793756.8.

* cited by examiner

*Primary Examiner* — Travis R Hunnings
(74) *Attorney, Agent, or Firm* — Boyle Fredrickson, S.C.

(57) ABSTRACT

A safety warning system including at least one sensor or sensor system to detect an abnormal safety situation relative to a safety zone, at least one network transmitter associated with the at least one sensor or sensor system, at least one controller associated with the at least one sensor or sensor system to receive information from the at least one sensor or sensor system and issue an alert signal based on a comparison of the information received and a safety setpoint, the alert signal issued over a safety zone network, and at least one wearable unit provided for each user in the safety zone, the wearable unit providing at least a tactile alert to the user based on the comparison to warn the user of the occurrence of an abnormal safety situation within the safety zone.

18 Claims, 4 Drawing Sheets

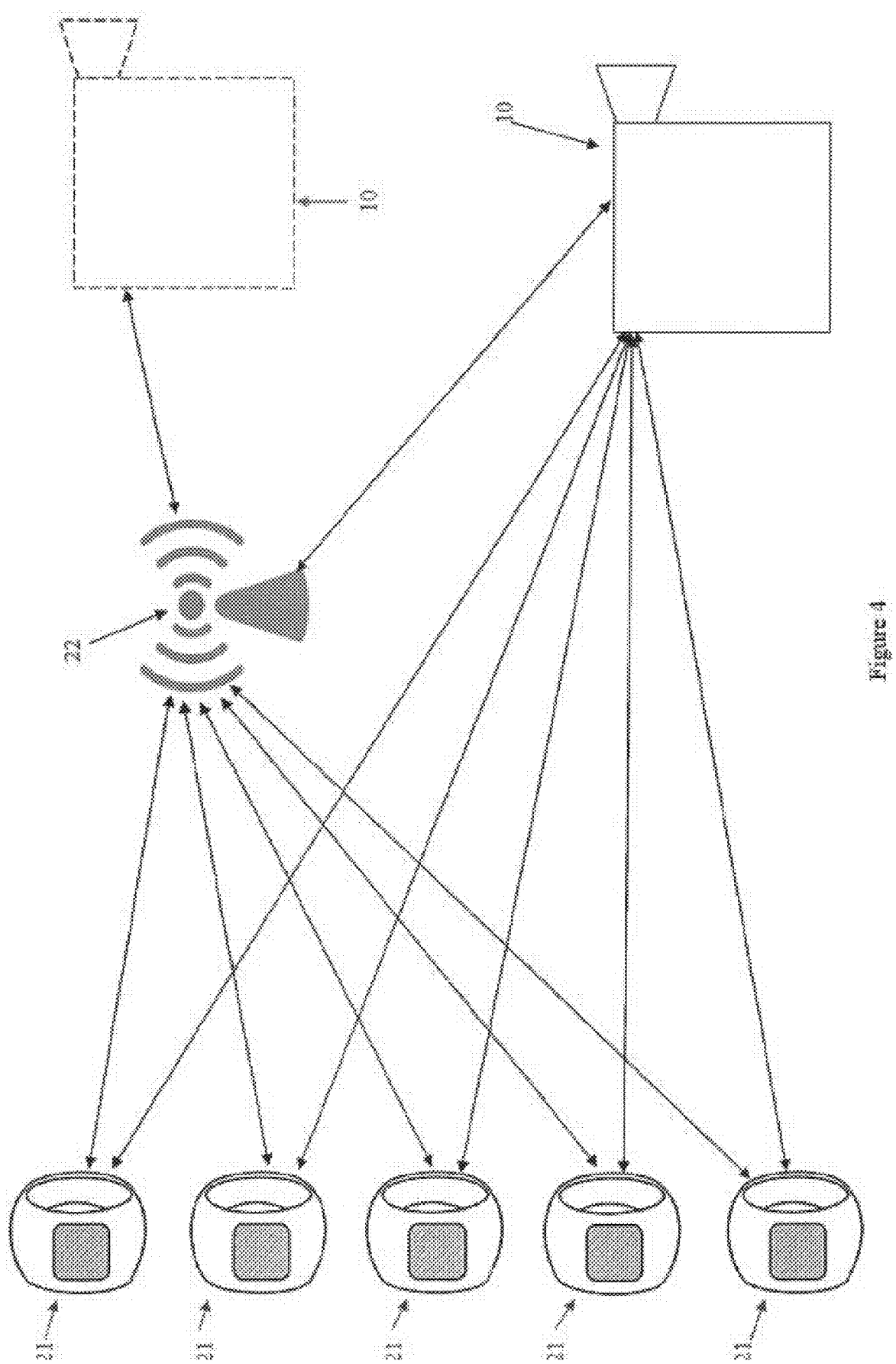

SAFETY WARNING SYSTEM

CROSS REFERENCE TO RELATED PATENT APPLICATIONS

This application is a continuation of U.S. application Ser. No. 17/049,418, filed on Oct. 21, 2020 and titled A Safety Warning System, which was a national application of international PCT/AU2019/050373, filed on Apr. 26, 2019 and titled A Safety Warning System, which claims priority to Australian patent application 2018901383, filed on Apr. 26, 2018, the contents of each of which are hereby incorporated by reference.

TECHNICAL FIELD

The present invention relates generally to a risk avoidance system and method, and more particularly, to a risk avoidance system and method that detects a danger in or approaching a defined area and provides a warning to people to reduce accident risk.

BACKGROUND ART

In situations such as roadworks, it is common for workers to be exposed to dangers caused by vehicles passing the roadworks. For example, on a multilane highway, the highway will not generally be completely closed to traffic meaning that workers working on the roadworks can still be injured or killed by traffic passing the roadworks, especially if even one of the vehicles is driven recklessly and/or at high speed.

The workers cannot necessarily spare attention from their work to worry about the activities of the vehicles, even though the vehicles likely posed the greatest risk to the workers.

Moreover, a roadworks situation such as this will often be quite loud, with noise from equipment being used and also from the passing traffic itself. Whether undertaken at night or during the day, the roadworks site will also typically be brightly lit for good vision when undertaking the repairs or maintenance on the road or infrastructure.

It will be clearly understood that, if a prior art publication is referred to herein, this reference does not constitute an admission that the publication forms part of the common general knowledge in the art in Australia or in any other country.

SUMMARY OF INVENTION

The present invention is directed to a safety warning system, which may at least partially overcome at least one of the abovementioned disadvantages or provide the consumer with a useful or commercial choice.

With the foregoing in view, the present invention in one form, resides broadly in a safety warning system including at least one sensor or sensor system to detect an abnormal safety situation relative to a safety zone, at least one network transmitter associated with the at least one sensor or sensor system, at least one controller associated with the at least one sensor or sensor system to receive information from the at least one sensor or sensor system and issue an alert signal based on a comparison of the information received and a safety setpoint, the alert signal issued over a safety zone network, and at least one wearable unit provided for each user in the safety zone, the wearable unit providing at least a tactile alert to the user based on the comparison to warn the user of the occurrence of an abnormal safety situation within the safety zone.

Preferably, the safety zone network is a network which is limited to the particular safety zone. In other words, the safety zone network will provide a communication network in relation to a particular safety zone, and for the components within that safety zone but will preferably not be dependent on outside infrastructure for operation, in particular, access to communications platforms. The safety zone network will preferably be self-contained within the particular safety zone.

The at least one controller associated with the at least one sensor or sensor system may be directly associated with the at least one sensor or sensor system and/or a network controller may be provided. In other words, the safety warning system may include a number of sensor units, each including at least one sensor and associated at least one network transmitter and with a sensor controller so that the comparison of information received in the safety setpoint can be accomplished at the sensor unit level with alerts distributed by at least one of the sensor units and/or a network controller may be provided to receive information from each of the sensors, process information to ascertain whether an alert is required and then issue the alert via at least one network transmitter. Importantly, the system of the present invention can operate either with at least one sensor unit by itself, or more than one sensor unit can be associated within a safety zone network and coordinated by a network controller.

In a preferred embodiment, the safety zone network is typically established using network infrastructure specific to the particular safety zone. That is, the safety zone network is not dependent on any other system for function and therefore issue alerts when no generic communication system is available.

The safety zone network will be designed and configured for different situations. In the context of the present specification, the description is particularly directed towards use of the system of the present invention for roadworks safety, but the system of the invention could be used for other situations where a safety zone is established and uses receive alerts based on abnormal safety situations within the safety zones and of which they would normally have difficulty recognising due to the users concentrating on their work in the area or travelling through the area.

In the system of the present invention, the alerts will typically be issued in real time based on the real time occurrence of abnormal safety situations occurring in or relative to the safety zone.

The system of the present invention can also be used to issue alerts to workers in general situations or according to general requirements such as general alarms, or requiring users to muster or assemble to convey messages for example.

The system of the present invention includes at least one sensor or sensor system to detect an abnormal safety situation relative to a safety zone. The number and location of the sensors will typically be dependent upon the configuration of the safety zone and the application to which the system of the present invention is to port. For example, there may be one or more sensors provided in a sensor system provided to establish a safety network in relation to roadworks taking place on a roadway. The configuration used in relation to roadworks will depend on the particular roadway configuration, for example whether there are multiple lanes in a single direction or a single lane in each direction as well as how many lanes are closed for the roadworks and the particular pattern of redirection of traffic that is required. The safety zone in this configuration will typically be defined around the roadworks and the locations in which workers undertaking the roadworks will typically be required in order to complete the roadworks. At least one sensor will typically therefore be trained toward oncoming traffic approaching the roadworks location in order to warn the workers in the roadworks safety zone of abnormal safety situations which may be or include an oncoming vehicle travelling at excessive speed or erratically.

As mentioned above, the system of the present invention may find use in any situation where a safety zone can be defined and an abnormal safety situation can be detected. Other applications to which the system of the present invention may be applied include defining safety zones in mines, on oil rigs, or even in office environments in relation to particular floors of the building or to the building as a whole.

Typically, the at least one sensor used in the system of the present invention will be dependent upon the particular parameter to be measured to define an abnormal safety situation. For example, in the example above of roadworks, one parameter which could be measured is speed of oncoming vehicles with an abnormal safety situation being defined as an oncoming vehicle travelling at excessive speed. The excessive speed may be excessive speed over and above a particular speed limit or alternatively, a speed limit which is required within a particular safety zone relative to the roadwork area. In this situation, a sensor which is adapted to measure the speed of vehicles will typically be used, such as a sensor using radar or laser speed measurement.

The at least one sensor may be provided in a sensor unit and the sensor unit may be mobile or the sensor unit may be stationary relative to the safety zone.

The sensor may be capable of recognising objects according to their behaviour and thus, may be capable of distinguishing between objects in order to gather information in relation to objects of relevance in order to decrease the occurrence of false positive alerts within the system.

The at least one sensor may be provided in the sensor unit together with at least one network transmitter and at least one sensor unit controller to allow the sensor unit to gather information, determine whether an alert should be issued and, if so, issue the alert directly from the sensor unit. In this way, a single sensor unit can be used to define a safety zone. Alternatively, more than one sensor unit may be used to define a safety zone with the operation of the sensor units being coordinated by a network controller.

The at least one sensor or sensor system will preferably detect a parameter, usually in relation to an object for comparison relative to a safety setpoint for that parameter and then an alert is issued based on the comparison. As should be clear by now, the information collected by the at least one sensor will be transmitted to a controller but the controller may be located in the same unit as the sensor and/or a safety network controller may be provided. An alert can be transmitted directly to the wearable units within the safety zone if a sensor unit controller is provided in association with a network transmitter that allows the sensor unit to transmit the alert directly. The sensor will typically be operated in association with software which is capable of undertaking the detection and comparison, and if a network transmitter is provided on board the sensor unit, transmission of the alert signal or message.

The software may operate on a network controller which may receive information from each of the sensors in a network, undertake the comparison, and transmit the alert signal message.

The at least one sensor will typically be positioned to monitor a particular area in relation to the safety zone. The sensor may be located within the safety zone or provided outside the safety zone in order to provide sufficient warning time to alert the users within the zone. Again, this will typically be dependent upon the nature and configuration of the safety zone itself as well is the particular parameter to be monitored. For example, at least one sensor may be provided some distance from the safety zone itself depending upon the particular hazard.

At least one, and typically a number of sensors may be used to create a geo-fence about the safety zone. A location or positioning system may be used in combination with the system of the present invention in order to allow the system to pinpoint the location of users through their wearable units. Alerts may be issued dependent upon the particular location of users within the safety zone.

As mentioned above, a network transmitter may be provided in a sensor unit with at least one sensor and at least one sensor unit controller. In a preferred embodiment, a network controller may also be provided in order to coordinate the operation of multiple sensor units.

At least one network transmitter is typically provided in order to ensure that all components within the system are connected together in the safety zone network. This can take a number of configurations, particularly dependent upon the nature and configuration of the safety zone. In some embodiments, a single sensor unit could be used which is capable of detecting, comparing and transmitting an alert signal to all of the wearable units within the safety zone or alternatively, a number of sensor units may be provided, coordinated by a network controller and a number of network transmitters are provided spaced around the safety zone such that the network controller instructs the network transmitters to cause an alert signal to be issued to the wearable units within the safety zone.

As mentioned above, it is preferred that the safety zone network be a self-contained and standalone network operable without access to generic communication systems such as mobile phone or telephony networks or other data networks. In this way, the safety zone network can be set up in relation to a particular safety zone and can operate whether or not other data networks are operating in that particular area. It is particularly preferred that the safety zone network be independent of mass use transmission networks, although there may be situations where the system of the present invention may utilise these networks if necessary or available.

Information within the system of the present invention will typically be transmitted to storage for reporting or logging purposes.

The alert may be of any type and in particular, may be a signal and/or include a message. It is particularly preferred that the alert signal trigger at least one tactile action in the wearable unit. As mentioned above, the alert may be issued directly to the wearable units from the at least one sensor. One or more repeater stations may be provided within the safety zone in order to ensure that the alert signal reaches all of the wearable units. Repeater stations may, for example, be provided on fixed or mobile infrastructure that is required for the particular action taking place within the safety zone, for example, one or more trucks used to ferry workers to a roadwork site may include repeater stations.

The system of the present invention also includes at least one wearable unit provided for each user in the safety zone, the wearable unit providing at least a tactile alert to the user based on the comparison to warn the user of the occurrence of an abnormal safety situation within the safety zone. As mentioned above, the definition of an abnormal safety situation will typically be whether an abnormal safety situation is or is about to occur within the safety zone, but may be based on information which is gathered from outside the safety zone.

The at least tactile alert to the user will typically be in the form of a haptic or vibration alert based on alerting the user through the sense of touch. In many situations, excessive noise or light may prevent the user hearing or seeing an alert, but providing a wearable unit through which an alert is provided using the sense of touch will typically allow the alerting of the user in a wider variety of situations and in conditions where the user may otherwise not see or hear an alert if issued in that form.

The wearable units may have an input interface as well as providing the tactile alert, as an input interface may allow the user to confirm receipt of the alert, for example.

The wearable unit may include a GPS receiver or access to another location system, allowing the location of the user to be ascertained through location of their wearable unit.

Each wearable unit within the system of the present invention will preferably be synced or linked with the safety zone network including one or more sensor unit controllers and/or one or more system controllers in order to ensure that each wearable unit within the safety zone will receive any alerts that are issued that are relevant to the particular user.

The wearable unit will typically operate to receive alerts and/or provide communication with system infrastructure independent of a generic mobile or data network.

The wearable unit may be a passive unit to which alerts are pushed or which waits for an alert to issue. Alternatively, the wearable unit may be an active unit which may actively poll the system for alerts.

The wearable unit may issue a heartbeat signal to the system controller or sensor controllers in order to establish that each wearable unit within the safety zone is operational. If communication with a wearable unit within the safety zone network is lost, then this can be used as evidence that an issue has occurred with the user and/or the wearable unit. In a particularly preferred embodiment, each wearable unit will typically be uniquely identified within the safety zone network in order for the system of the present invention to identify each particular wearable unit and thereby identify each user.

An alert may be provided in one or more specific types. For example, different alerts may be used for different situations or based on different information. For example, an urgent alert may be issued to users located on an approach side of a safety zone, or on the side from which the hazard is approaching, and a lower level alert may be issued to users located on a departure side of safety zone or on the side further away from the hazard.

Alerts may be issued at different levels depending upon the nature of the abnormal safety situation. In a particularly preferred embodiment, the alert typically notifies the user of the existence of an abnormal safety situation and also the level of risk from the abnormal safety situation. It is preferred that the sensor unit controller and/or system controller not only identify the existence of an abnormal safety situation, but also ascribe to each wearable unit a level of risk from that abnormal safety situation and then alerts are issued accordingly.

The system of the present invention may use the wearable unit to monitor the health or condition of the user and/or the environment in which the user is operating. For example, the wearable unit may be used to monitor the heart rate, breathing, or body temperature of the user and/or the ambient temperature and/or environmental condition in which the user is operating.

As mentioned above, the alert (including the notification and/or the risk level) may be provided to different users through their wearable units depending upon the location of the user within the safety zone.

It can be seen that the system of the present invention provides a useful and highly configurable system that is self-contained to define a safety zone and then to detect abnormal safety situations that may affect users within that safety zone and issue alerts to those users based on the nature and level of risk associated with an abnormal safety situation through a tactile alert.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 4 is a schematic view of the interaction between the wearable units, the network controller and transmitter, and a sensor unit according to a preferred embodiment of the present invention,

DESCRIPTION OF EMBODIMENTS

According to a particularly preferred embodiment of the present invention, a safety warning system is provided.

The safety warning system of the illustrated embodiment is particularly directed towards use of the system of the present invention for roadworks safety, but the system of the invention could be used for other situations where a safety zone is established and users receive alerts based on abnormal safety situations within the safety zone and which they would normally have difficulty recognising due to the users concentrating on their work in the area or travelling through the area.

Figure 1:
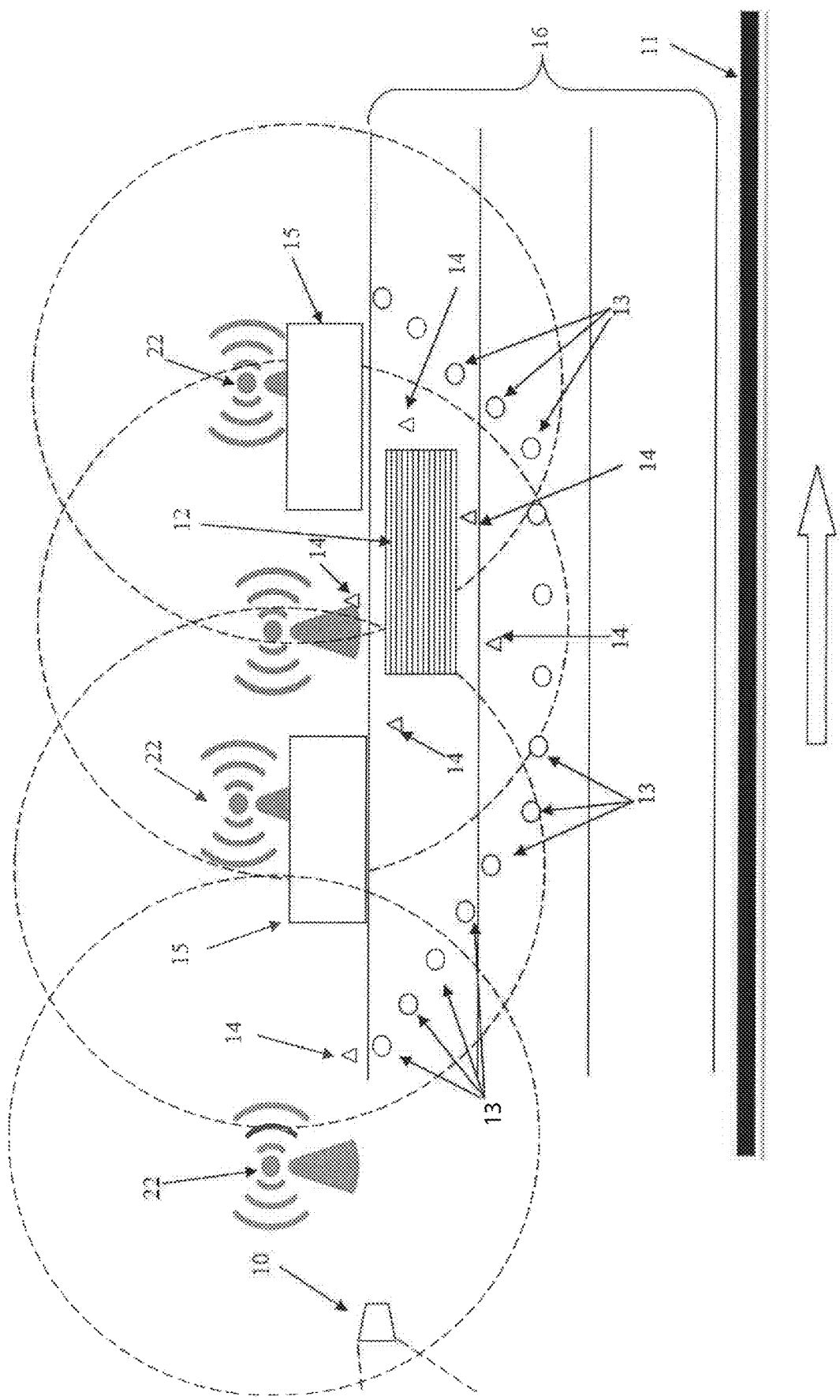
FIG. 1 is a schematic view of the operation of a safety warning system according to a preferred embodiment configured for a roadwork situation.

As illustrated in FIG. 1, a roadwork zone has been set up on a three lane roadway 16 with all traffic in the three lanes travelling in the direction of the large arrow. Typically in this configuration, the roadway will have a central barrier 11 to separate the directions of travel. The roadwork zone includes a work area 12 where the actual repair or maintenance work is being undertaken. The roadwork zone is defined using a number of indicator cones 13, which are used to indicate to motorists that two lanes are closed to traffic flow, leaving the inner lane closest to the barrier 11 for vehicles to pass the roadwork zone.

Workers 14 generally move around within the roadwork zone, inside the indicator cones 13. The workers typically drive to the roadwork zone in trucks 15 or other vehicles which can be parked off to the side of the roadworks but may be parked in one or more of the lanes closed to travel, inside the roadwork zone.

Figure 2:
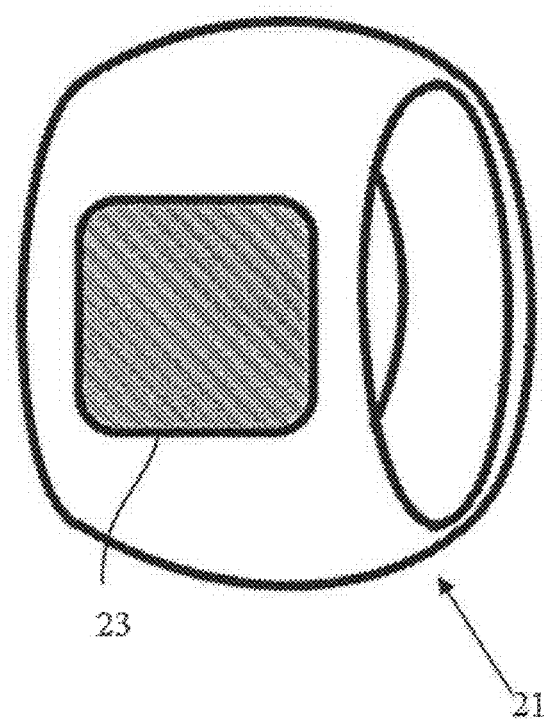
FIG. 2 is a schematic view of a wearable unit according to a preferred embodiment of the present invention.
Figure 3:
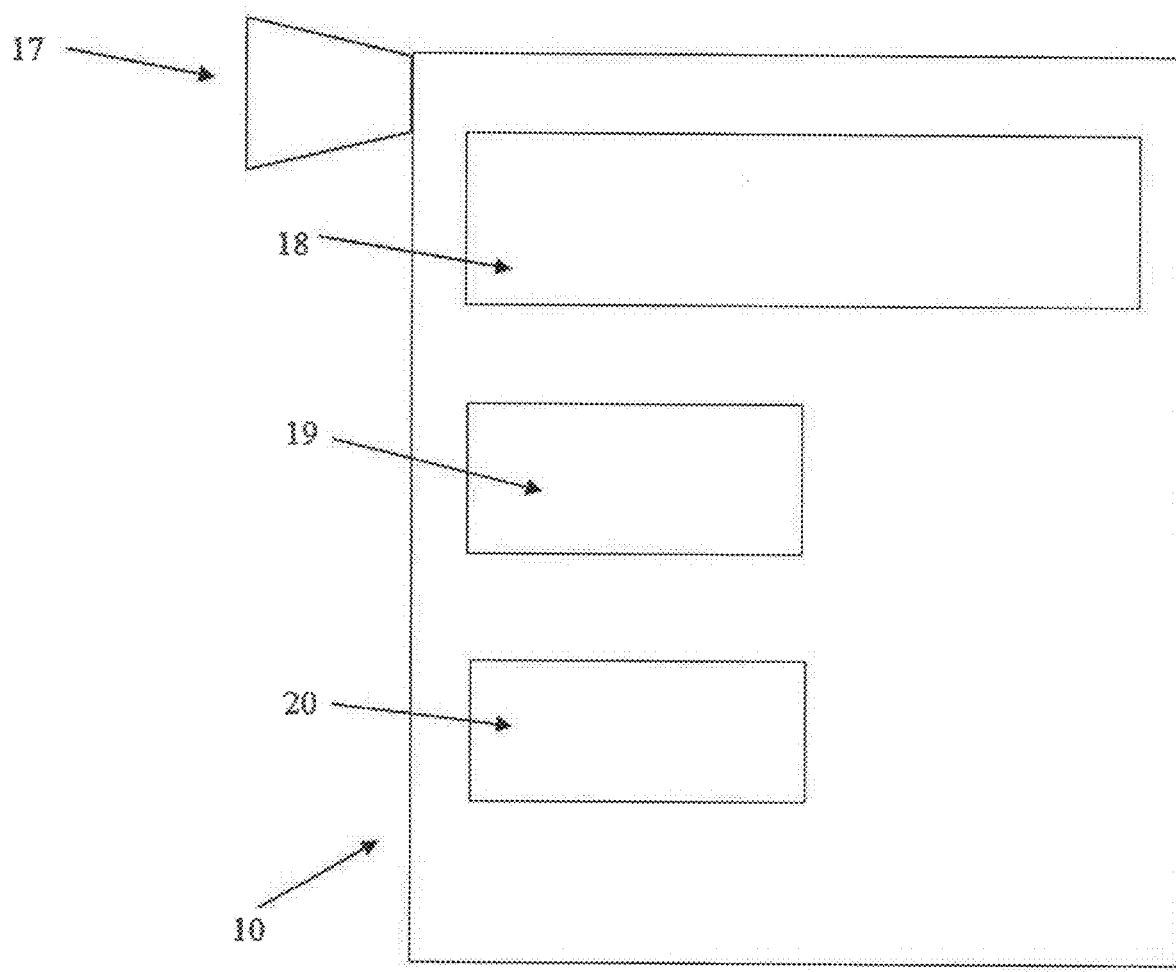
FIG. 3 is a schematic view of a sensor unit according to a preferred embodiment of the present invention.

The safety warning system of the illustrated embodiment includes at least one sensor unit 10 to detect an abnormal safety situation relative to a safety zone. An example configuration of a sensor unit is shown in FIG. 3. In this embodiment, the sensor unit 10 includes a sensor 17 to detect an abnormal safety situation, usually associated with its own sensing componentry 18, a network transmitter 20 associated with the sensor 17, and a controller 19 associated with the sensor 17 to receive information from the sensor 17 and issue an alert signal via the transmitter 20, based on a comparison of the information received from the sensor 17 and a safety setpoint for a parameter being monitored. The alert signal is issued over a safety zone network which will be discussed further below. A wearable unit 21, such as that illustrated in FIG. 2, is provided for each user in the safety zone, the wearable unit 21 providing at least a tactile alert to the user based on the comparison to warn the user of the occurrence of an abnormal safety situation within the safety zone.

In the preferred embodiment, the safety zone network is a network limited to the particular safety zone. In other words, the safety zone work provides a communication network in relation to the particular safety zone and for the components within that safety zone but is not dependent on outside infrastructure for operation, in particular, access to communications platforms. The safety zone network is self-contained within the particular safety zone.

In a preferred embodiment, the safety zone network is typically established using network infrastructure specific to the particular safety zone. That is, the safety zone network is not dependent on any other system for function and therefore issue alerts when no generic communication system is available.

In the system of the present invention, the alerts will typically be issued in real time based on the real time occurrence of abnormal safety situations occurring in or relative to the safety zone.

The system of the illustrated embodiment includes a sensor unit 10 to detect an abnormal safety situation relative to a safety zone. However, the number and location of sensor units 10 used in relation to a safety zone will typically be dependent upon the configuration of the safety zone and the hazard to which the system of the present invention is to alert users. For example, there may be one or more sensor units 10 provided in a sensor system provided to establish a safety network in relation to roadworks taking place on a roadway. The configuration used in relation to roadworks will depend on the particular roadway configuration, for example, whether there are multiple lanes in a single direction or a single lane in each direction as well as how many lanes are closed for the roadworks and the particular pattern of redirection of traffic that is required. The safety zone in this configuration will typically be defined around the roadworks and the locations in which workers undertaking the roadworks will typically be required in order to complete the roadworks. At least one sensor unit 10 is therefore trained toward oncoming traffic approaching the roadworks location, as shown in FIG. 1, in order to warn the workers 14 in the roadworks safety zone of abnormal safety situations which may be or include an oncoming vehicle travelling at excessive speed or being driven erratically.

Typically, the sensor 17 used in the system will be dependent upon the particular parameter to be measured to define an abnormal safety situation. For example, in the example above of roadworks, one parameter which could be measured is speed of oncoming vehicles with an abnormal safety situation being defined as an oncoming vehicle travelling at excessive speed. Normally a setpoint will be provided to the system defining what speed is "excessive". There may be levels of hazard defined based on the vehicle speed with different levels of alerts issued based on the level of hazard. The "excessive speed" may be speed over and above a particular speed limit or alternatively, a speed limit which is required within a particular safety zone relative to the roadwork area. In this situation, a sensor 17 that is adapted to measure the speed of vehicles will typically be used such as a sensor using radar or laser speed measurement.

The sensor 17 is preferably also capable of recognising objects according to their behaviour and, thus, may be capable of distinguishing between objects in order to gather information in relation to objects of relevance in order to decrease the occurrence of false positive alerts within the system. The sensor may also be capable of "tagging" a vehicle so that the sensor can maintain monitoring of one or more tagged vehicles.

As mentioned above, the sensor 17 may be provided in the sensor unit 10 together with a network transmitter 20 and at least one sensor unit controller 19 to allow the sensor unit 10 to gather information and determine whether an alert should be issued and if so, issue the alert directly from the sensor unit 10. In this way, a single sensor unit 10 can be used to define a safety zone. Alternatively, more than one sensor unit 10 may be used to define a safety zone with the operation of the sensor units 10 being coordinated by a safety zone network controller.

The sensor 17 will preferably detect a parameter, usually in relation to an object for comparison relative to a safety set-point for that parameter, and then an alert is issued based on the comparison. As should be clear by now, the information collected by the sensor 17 is transmitted to a controller 19, but the controller 19 may be located in the same unit as the sensor 17 as shown in FIG. 3 and/or a safety zone network controller may be provided to coordinate the sensor units provided in relation to one or more particular safety zones. An alert can be transmitted directly to the wearable units 21 within the safety zone if a sensor unit controller 19 is provided in association with a network transmitter 20, which allows the sensor unit 10 to transmit the alert directly. The sensor unit 10 will typically be operated in association with software that is capable of undertaking the detection using the sensor 17 and comparison of the information to the set-point, and if a network transmitter 20 is provided on board the sensor unit 10, transmission of the alert signal or message.

Software may operate on a safety zone network controller that may receive information from each of the sensors units 10 in a network, undertake the comparison, and transmit the alert signal message to remove processing load from the sensor units 17, which may allow the sensor units to be smaller in size.

The sensor unit 10 will typically be positioned to monitor a particular area in relation to the safety zone. The sensor unit 10 may be located within the safety zone or provided outside the safety zone in order to provide sufficient warning time to alert the users within the zone. Again, this will typically be dependent upon the nature and configuration of the safety zone itself, as well is the particular parameter to be monitored. For example, as shown in FIG. 1, the sensor unit 10 may be provided some distance from the safety zone itself in order to provide sufficient alert time for the workers to seek safety, for example, from an oncoming vehicle driven at high speed.

At least one, and typically a number of sensors or sensor units 10 may be used to create a geo-fence about the safety zone. A location or positioning system such as GPS may be used in combination with the system of the present invention in order to allow the system to pinpoint the location of users through their wearable units 21. Alerts may be issued dependent upon the particular location of users within the safety zone or different levels of alerts may be issued dependent upon the particular location of users within the safety zone.

As mentioned above, a network transmitter 20 may be provided in a sensor unit 10 with a sensor 17 and at least one sensor unit controller 19. In a preferred embodiment, a safety zone network controller may also be provided in order to coordinate the operation of multiple sensor units 10.

At least one network transmitter is typically provided in order to ensure that all components within the system are connected together in the safety zone network. This can take a number of configurations, particularly dependent upon the nature and configuration of the safety zone. In some embodiments, a single sensor unit 10 could be used which is capable of detecting, comparing, and transmitting an alert signal to all of the wearable units 21 within the safety zone or, alternatively, a number of sensor units 10 may be provided, coordinated by a network controller and a number of network transmitters are provided spaced around the safety zone such that the network controller instructs the network transmitters to cause an alert signal to be issued to the wearable units within the safety zone. Still further, a single sensor unit 10 may be provided but the safety zone may be provided with a number of transmitters or repeater transmitters 22 to ensure that the alert is transmitter to all wearable units 21 in the safety zone. This last configuration is illustrated in FIG. 1.

The controller 19 associated with the sensor unit 10 or sensor system may be directly associated with the sensor unit 10 and/or a network controller may be provided. In other words, the safety warning system may include a number of sensor units 10, each including at least one sensor 17 and associated to at least one network transmitter 20 and with a sensor controller 19, so that the comparison of information received in the safety setpoint can be accomplished at the sensor unit level with alerts distributed by at least one of the sensor units 10, and/or a network controller may be provided to receive information from each of the sensors 17 or sensor units 10, process information to ascertain whether an alert is required and then issue the alert via at least one network transmitter. Importantly, the system of the present invention can operate either with sensor unit 10 by itself or more than one sensor unit 10 can be associated within a safety zone network and coordinated by a network controller.

As mentioned above, it is preferred that the safety zone network is a self-contained and standalone network operable without access to generic communication systems such as mobile phone or telephony networks or other data networks. In this way, the safety zone network can be set up in relation to a particular safety zone and can operate whether or not other data networks are operating in that particular area. It is particularly preferred that the safety zone network be independent of mass use transmission networks although there may be situations where the system of the present invention may utilise these networks if necessary or available.

Information within the system of the present invention will typically be transmitted to storage for reporting or logging purposes.

The alert issued may be of any type and in particular, will normally be a signal provided to the wearable unit which when received, triggers the wearable unit to alert the user. In some cases, the alert can be or include a message. It is particularly preferred that the alert signal will trigger at least one tactile action in the wearable unit 21. As mentioned above, the alert may be issued directly to the wearable units 21 from the sensor unit 10 but one or more repeater transmitters 22 may be provided within the safety zone in order to ensure that the alert signal reaches all of the wearable units 21. Repeater transmitters 22 may, for example, be provided on fixed or mobile infrastructure that is required for the particular action taking place within the safety zone, for example, one or more trucks 15 used to ferry workers to a roadwork site may include repeater transmitters 22.

The system of the present invention also includes a wearable unit 21 provided for each user in the safety zone, the wearable unit 21 providing at least a tactile alert to the user based on the comparison to warn the user of the occurrence of an abnormal safety situation within the safety zone. As mentioned above, the definition of an abnormal safety situation will typically be whether an abnormal safety situation is or is about to occur within the safety zone, but may be based on information that is gathered from outside the safety zone.

The at least tactile alert to the user will typically be in the form of a haptic or vibration alert based on alerting the user through the sense of touch. In many situations, excessive noise or light may prevent the user hearing or seeing an alert, but providing a wearable unit 21 through which an alert is provided using the sense of touch will typically allow the alerting of the user in a wider variety of situations and in conditions where the user may otherwise not see or hear an alert if issued in that form.

The wearable units may have an input interface or button 23 as this may allow the user to confirm receipt of the alert, for example, allowing the system to track the users that have confirmed the alert and/or those that have not confirmed the alert so that remedial action can be taken for those users that have not confirmed the alert.

The wearable unit may include a GPS receiver or access to another location system allowing the location of the user to be ascertained through location of their wearable unit.

Each wearable unit 21 within the system of the present invention will preferably be synced or linked with the safety zone network including one or more sensor unit controllers and/or one or more system controllers in order to ensure that each wearable unit 21 within the safety zone will receive any alerts that are issued that are relevant to the particular user.

The wearable unit 21 will typically operate to receive alerts and/or provide communication with system infrastructure independent of a generic mobile or data network.

The wearable unit 21 may be a passive unit to which alerts are pushed or which waits for an alert to issue. Alternatively, the wearable unit 21 may be an active unit that may actively poll the system for alerts.

An alert may be provided in one or more specific types. For example, different alerts may be used for different situations or based on different information. For example, an urgent alert may be issued to users located on an approach side of a safety zone, or on the side from which the hazard is approaching and a lower level alert may be issued to users located on a departure side of safety zone or on the side further away from the hazard.

Alerts may be issued at different levels depending upon the nature of the abnormal safety situation. In a particularly preferred embodiment, the alert typically notifies the user of the existence of an abnormal safety situation and also the level of risk from the abnormal safety situation. It is preferred that the sensor unit controller and/or system controller not only identify the existence of an abnormal safety situation, but also ascribe to each wearable unit 21 a level of risk from that abnormal safety situation and then alerts are issued accordingly.

It can be seen that the system of the present invention provides a useful and highly configurable system that is self-contained to define a safety zone and then to detect abnormal safety situations that may affect users within that safety zone and issue alerts to those users based on the nature and level of risk associated with an abnormal safety situation through a tactile alert.

In the present specification and claims, the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A safety warning system including:
   at least one sensor or sensor system to detect an abnormal safety situation that is occurring or is about to occur within a safety zone, the at least one sensor or sensor system detecting a parameter, in relation to an object for comparison relative to a safety setpoint for that parameter;
   at least one network transmitter to cause the at least one sensor or sensor system, to issue an alert signal based on the comparison, wherein the at least one network transmitter establishes a self-contained safety zone network limited to the safety zone and which is independent of both outside infrastructure and access to external communications platforms for operation;
   at least one network controller to coordinate the at least one sensor or sensor system to receive information from the at least one sensor or sensor system and issue the alert signal based on the comparison of the information received and the safety setpoint, the alert signal issued over the self-contained safety zone network; and
   at least one wearable unit provided for each user in the safety zone, the wearable unit providing at least a tactile alert to the user based on the comparison to warn the user of the occurrence of the abnormal safety situation that is occurring or is about to occur within the safety zone;
   wherein the at least one, and typically a number of sensors, are used to create a geo-fence about the safety zone and a location or positioning system is used in order to allow the system to pinpoint the location of users through their wearable units and alerts are issued dependent upon the particular location of users within the safety zone; wherein the at least tactile alert to the user is in the form of a haptic or vibration alert based on alerting the user through a sense of touch.

2. A safety warning system as claimed in claim 1 wherein the at least one sensor or sensor system is configured to sense a speed or velocity of each of at least one vehicle relative to the safety zone and one or more safety setpoints is provided in terms of a speed limit, a detection of a vehicle travelling above the one or more safety setpoints triggering the issue of an alert signal.

3. A safety warning system as claimed in claim 1 the at least one wearable unit is configured to provide the tactile alert to the user at different levels depending upon a nature of the abnormal safety situation and/or depending upon a location of the user within the safety zone.

4. A safety warning system as claimed in claim 1 wherein the at least one network controller associated with the at least one sensor or sensor system is a sensor controller directly associated with each at least one sensor or sensor system in a sensor unit so that the comparison of information received in a safety setpoint can be accomplished at the sensor unit with alerts distributed by at least one of the sensor units.

5. A safety warning system as claimed in claim 1 wherein the system includes a number of sensor units, each sensor unit including at least one sensor and a sensor controller, and the at least one network controller associated to each of the sensor units to receive information from each sensor unit and process information to ascertain whether an alert is required and then issue the alert via at least one network transmitter.

6. A safety warning system as claimed in claim 1 wherein the alerts are issued in real time based on a real time occurrence of abnormal safety situations occurring in or relative to the safety zone.

7. A safety warning system as claimed in claim 1 wherein the at least one sensor is provided in a mobile sensor unit.

8. A safety warning system as claimed in claim 1 wherein the at least one sensor is positioned to monitor a particular area in relation to the safety zone.

9. A safety warning system as claimed in claim 1 wherein information within the system of the present invention is transmitted to storage for reporting or logging purposes.

10. A safety warning system as claimed in claim 1 wherein one or more of a repeater station is provided within the safety zone in order to ensure that the alert signal reaches all of the wearable units.

11. A safety warning system as claimed in claim 1 wherein each wearable unit has an input interface as well as providing the tactile alert as an input interface to allow the user to confirm receipt of the alert.

12. A safety warning system as claimed in claim 1 wherein the wearable unit includes a location receiver allowing the location of the user to be ascertained through location of their wearable unit.

13. A safety warning system as claimed in claim 1 wherein each wearable unit is synced or linked with the safety zone network to ensure that each wearable unit within the safety zone will receive any alerts that are issued that are relevant to the particular user.

14. A safety warning system as claimed in claim 1 wherein the wearable unit issues a signal to at least one network controller in order to establish that each wearable unit within the safety zone is operational.

15. A safety warning system as claimed claim 1 wherein each wearable unit is uniquely identified within the safety zone network to identify each particular wearable unit and thereby, identify each user.

16. A safety warning system as claimed in claim 1 wherein the sensor unit controller and/or network controller identify the existence of an abnormal safety situation, but also ascribe to each wearable unit, a level of risk from that abnormal safety situation and then the alerts are issued accordingly.

17. A safety warning system as claimed in claim 1 wherein the wearable unit also monitors a health or condition of the user and/or the environment in which the user is operating.

18. A safety warning system as claimed in claim 1 wherein the wearable unit issues a heartbeat signal to the at least one network controller in order to establish that each wearable unit with the safety zone is operational.

\* \* \* \* \*